(12) United States Patent
Lim et al.

(10) Patent No.: US 6,573,622 B2
(45) Date of Patent: Jun. 3, 2003

(54) MULTI-PHASE LINEAR MOTOR HAVING AN INTEGRATED COIL ASSEMBLY AND METHOD FOR FORMING THE INTEGRATED COIL ASSEMBLLY

(75) Inventors: Howe Yuen Lim, Singapore (SG); Chai Meng Goh, Singapore (SG); Guolin Xu, Singapore (SG)

(73) Assignee: PBA Systems PTE Ltd., Singapore (SG)

( * ) Notice: Subject to any disclaimer, the term of this patent is extended or adjusted under 35 U.S.C. 154(b) by 0 days.

(21) Appl. No.: 09/804,204

(22) Filed: Mar. 12, 2001

(65) Prior Publication Data

US 2002/0125773 A1 Sep. 12, 2002

(51) Int. Cl.[7] ............................................. H02K 41/00
(52) U.S. Cl. ....................................................... 310/12
(58) Field of Search .............................. 310/12, 13, 14; 318/135

(56) References Cited

U.S. PATENT DOCUMENTS

| | | | |
|---|---|---|---|
| 3,622,818 A | * 11/1971 | Payen | 31/13 |
| 4,151,447 A | 4/1979 | Von der Heide et al. | 318/135 |
| 4,318,038 A | 3/1982 | Munehiro | 318/135 |
| 4,369,383 A | 1/1983 | Langley | 310/12 |
| 4,749,921 A | 6/1988 | Chitayat | 318/135 |
| RE34,674 E | 7/1994 | Beakley et al. | 310/12 |
| 5,334,937 A | * 8/1994 | Peck et al. | 324/318 |
| 5,532,533 A | * 7/1996 | Mitzutani | 310/68 B |
| 5,703,418 A | 12/1997 | Assa | 310/12 |
| 5,783,877 A | 7/1998 | Chitayat | 310/12 |
| 5,998,890 A | 12/1999 | Sedgewick et al. | 310/12 |

* cited by examiner

Primary Examiner—Nestor Ramirez
Assistant Examiner—Judson H. Jones
(74) Attorney, Agent, or Firm—Conley Rose, P.C.

(57) ABSTRACT

An integrated coil assembly (10), a multi-phase linear motor having the integrated coil assembly (10) and a method (100) for forming the integrated coil assembly (10) are described. The integrated coil assembly (10) has multi-phase coils with each multi-phase coil (20) having a number of coil loops based upon the number of electrical phases of current required by the multi-phase linear motor. The coil loops of different multi-phase coils are interweaved at two opposing portions (11,12) and are substantially parallel at two other opposing portions (13,14). In the method (100), different wire dispensers wind coil loops for different electrical phase for each multi-phase coil (20). However, the same wire dispenser winds coil loops that are for the same electrical phase for different multi-phase coils (20). The coil loops for each multi-phase coil (20) are wound before the coil loops of another multi-phase coil (20) are wound.

18 Claims, 5 Drawing Sheets

$H2 = H1 + 2t_2$ $H3 = H2 + 2t_3$

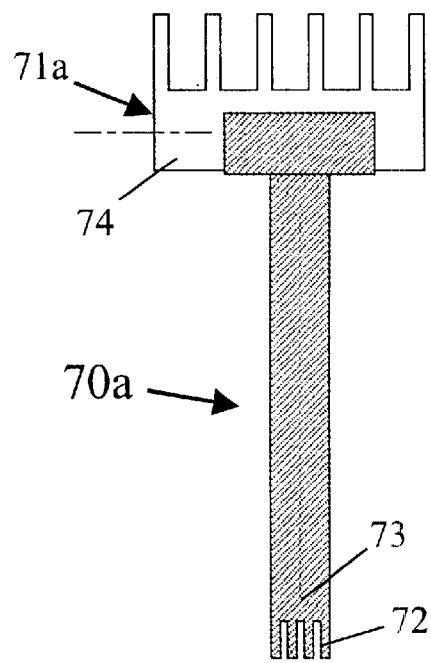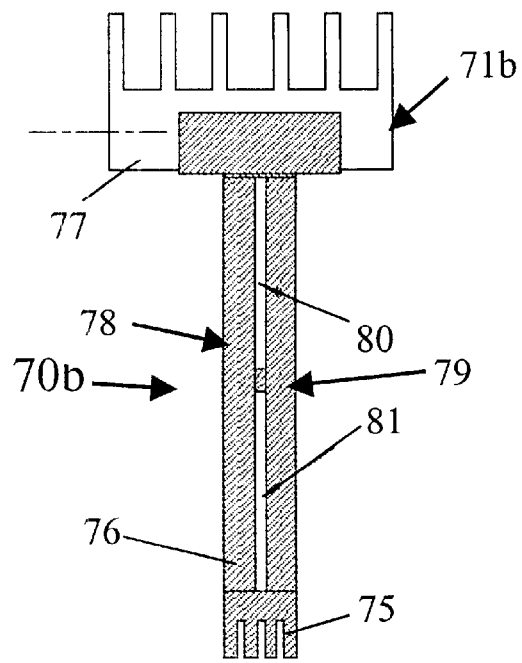
FIG. 6A    FIG. 6B
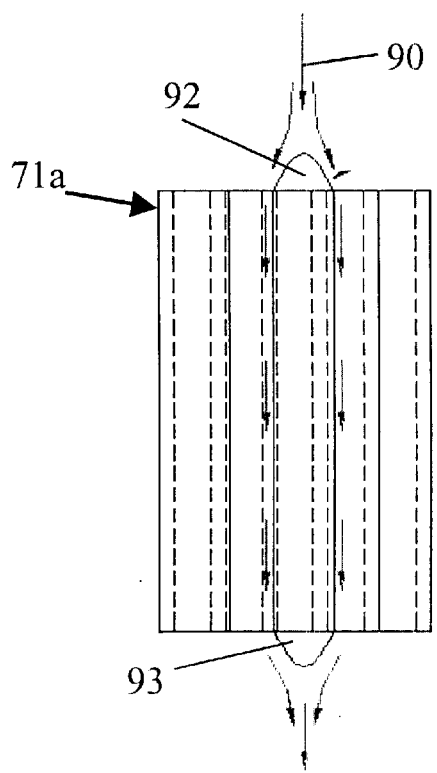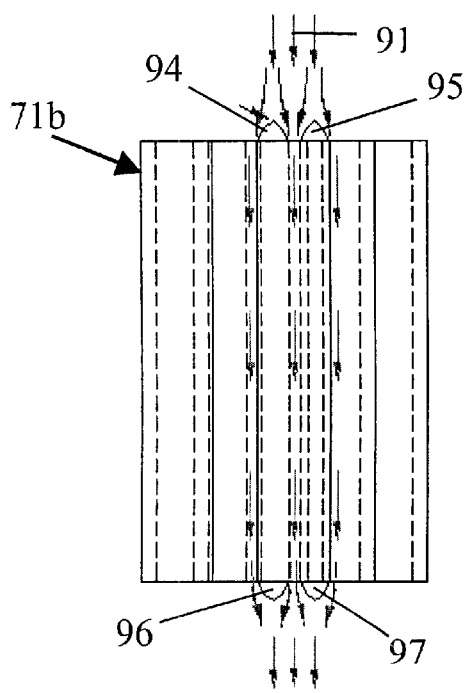
FIG. 7A    FIG. 7B

MULTI-PHASE LINEAR MOTOR HAVING AN INTEGRATED COIL ASSEMBLY AND METHOD FOR FORMING THE INTEGRATED COIL ASSEMBLLY

FIELD OF THE INVENTION

This invention relates to moving coil assemblies used in, for example, linear motors. In particular, this invention relates to an integrated coil assembly for a linear motor and method for forming the integrated coil.

BACKGROUND

Existing linear motors typically include wire coils that form magnetic circuits to conduct current and thereby enable such motors to produce a linear force. Generally, the linear force produced is proportional to the current passing through coil windings of the wire coils and magnetic flux density of the magnetic circuits.

As a result of the electrical resistance of such wire coils, the current conducted through the coil windings also generate heat. In some instances, overheating may result when, for example, a large current is required to produce a continuous linear force that is sufficient to move a heavy load. Thus, efficient heat dissipation is necessary to prevent overheating in such instances.

Furthermore, heat may be unevenly generated in existing multi-phase linear motors. Uneven heat generation for a multi-phase linear motor can occur when, for example, a load is maintained at a fixed position at which one or more phases is drawing more current than another one or more phases. This occurs particularly when the load is held in a vertical position against gravity forces. Consequently, the coils of the multi-phase linear motor do not generate heat evenly and any heat generated is also not dissipated evenly.

Reissued U.S. Pat. No. 34,647, issued to Beakley et al on Jul. 26, 1994 and assigned to Trilogy Systems, and U.S. Pat. No. 5,998,890 issued to Sedgewick et al on Dec. 7, 1999 and assigned to Airex Corporation, both describe techniques to improve heat dissipation using improved coil designs. U.S. reissued Pat. No. 34,647 describes separate coils that are placed together to form a coil assembly and use heat-sinking elements, such as an epoxy and an aluminium plate, to dissipate heat. In a similar manner, U.S. Pat. No. 5,998,890 also describes heat-sinking elements for heat dissipation as well as placement of individual coils sequentially offset from adjacent phases to improve heat dissipation.

However, the separate coils in the above prior art coil designs are still subject to uneven heat dissipation in certain circumstances. This is because individual coils are formed separately and then placed sequentially offset from adjacent phases to form a coil assembly. Such placement is difficult to control and, where inaccurate placement occurs, the power output of a multi-phase linear motor using the coil assembly is thus subject to inconsistency and therefore undesirable.

Therefore, a need clearly exists for a coil assembly for multi-phase linear motors that enables a consistent linear force to be provided for different phases and in which heat can be more effectively dissipated.

SUMMARY

In accordance with one aspect of the invention, there is disclosed an integrated coil assembly comprising:

a plurality of multi-phase coils, each multi-phase coil having a plurality of coil loops, each coil loop having at least one coil winding and associated with a respective electrical phase, wherein the plurality of coil loops for different multi-phase coils are interweaved at two opposing portions of the plurality of multi-phase coils to form the integrated coil assembly.

Generally, a coil loop of a subsequent multi-phase coil for conducting current at an electrical phase can be formed adjacent to a coil loop of a preceding multi-phase coil for conducting current at the electrical phase.

More generally, the plurality of coil loops of the integrated coil assembly can have two other opposing portions, the two other opposing portions being substantially parallel to each other.

Optionally, coil loops for each multi-phase coil can have substantially the same coil width relative to each other.

More optionally, coil loops for different multi-phase coils of the integrated coil assembly can have substantially the same coil width relative to each other.

Generally, at each of the two opposing portions, coil loops of a subsequent multi-phase coil can be larger than coil loops of a preceding multi-phase coil.

Optionally, at each of the two opposing portions, coil loops of a subsequent multi-phase coil are larger than coil loops of a preceding multi-phase coil by the thickness of coil windings of the preceding subsequent multi-phase coil.

In accordance with another aspect of the invention, there is disclosed a multi-phase linear motor for producing a linear force, the multi-phase linear motor comprising:

a coil assembly mount having a mounting portion and at least one fin disposed thereon for dissipating heat; and an integrated coil assembly, mountable to the mounting portion, having:

a plurality of multi-phase coils, each multi-phase coil having a plurality of coil loops, each coil loop having at least one coil winding and associated with a respective electrical phase, wherein the plurality of coil loops for different multi-phase coils are interweaved at two opposing portions of the plurality of multi-phase coils to form the integrated coil assembly.

Generally, a coil loop of a subsequent multi-phase coil for conducting current at an electrical phase can be formed adjacent to a coil loop of a preceding multi-phase coil for conducting current at the electrical phase.

More generally, the plurality of coil loops of the integrated coil assembly can have two other opposing portions, the two other opposing portions being substantially parallel to each other.

Optionally, coil loops for each multi-phase coil can have substantially the same coil width relative to each other.

More optionally, coil loops for different multi-phase coils of the integrated coil assembly can have substantially the same coil width relative to each other.

Generally, at each of the two opposing portions, coil loops of a subsequent multi-phase coil can be larger than coil loops of a preceding multi-phase coil.

Optionally, at each of the two opposing portions, coil loops of a subsequent multi-phase coil are larger than coil loops of a preceding multi-phase coil by the thickness of coil windings of the preceding subsequent multi-phase coil.

Optionally, the integrated coil assembly can further comprise a molding compound to mold the integrated coil assembly for mounting to the mounting portion.

More optionally, the integrated coil assembly can comprise at least one fin molded from the molding compound.

Further optionally, the integrated coil assembly can comprise at least one groove molded from the molding compound.

Yet more optionally, the integrated coil assembly can comprise molded side edges, the molded side edges being tapered to support air flow.

In accordance with yet another aspect of the invention, there is disclosed a method for forming an integrated coil assembly for a multi-phase linear motor, the integrated coil assembly having a plurality of multi-phase coils, each multi-phase coil having a plurality of coil loops, each coil loop having at least one coil winding and associated with a respective electrical phase, the method comprising the steps of:

(a) winding a first coil loop of a multi-phase coil with a first wire dispenser;

(b) winding another coil loop of the multi-phase coil with another wire dispenser;

(c) repeating the (b) winding another coil loop step, wherein the repeating step is based upon the number of the plurality of coil loops for the multi-phase coil; and (d) performing steps (a) to (c) for another multi-phase coil of the integrated coil assembly upon completion of the (c) repeating step for the multi-phase coil, wherein the (d) performing step is based upon the number of the plurality of multi-phase coils required for the multi-phase linear motor.

Generally, the (d) performing step can comprise the step of offsetting position of the another multi-phase coil relative to position of a preceding multi-phase coil.

More generally, the (d) performing step can further comprise the step of winding the another multi-phase coil over the preceding multi-phase coil at two opposing portions.

Still more generally, the (d) performing step can further comprise the step of winding the another multi-phase coil using a winding fixture, the winding fixture being the same for coiling the preceding multi-phase coil.

Optionally, the (a) and (b) winding steps can comprise the step of winding, for each of the coil loops, two opposing portions substantially parallel to each other.

Generally, the (a) and (b) winding steps can comprise the step of winding, for each multi-phase coil, coil loops having substantially the same coil width relative to each other.

More generally, the (a) and (b) winding steps can comprise the step of winding, for different multi-phase coils of the integrated coil assembly, coil loops having substantially the same coil width relative to each other.

Optionally, the method can further comprise the step of molding the plurality of multi-phase coils upon completion of the (d) performing step.

More optionally, the molding step can comprise the step of forming at least one fin with a mold compound.

Still more optionally, the molding step can comprise the step of forming at least one groove between the plurality of multi-phase coils.

Yet more optionally, the molding step can comprise the step of molding at least one mount engagement portion for mounting the integrated coil assembly to a coil assembly mount of the multi-phase linear motor.

BRIEF DESCRIPTION OF THE DRAWINGS

Preferred embodiments of the invention are described hereinafter with reference to the drawings, in which:

FIGS. 6A and 6B are cross-sectional side views of two additional molded embodiments of the integrated coil assembly of FIG. 1 when respectively mounted to two coil assembly mounts;

FIGS. 7A and 7B are plan views illustrating air flow for heat dissipation for the two additional molded embodiments of FIG. 6A and 6B, respectively.

DETAILED DESCRIPTION

An integrated coil assembly, a multi-phase linear motor having the integrated coil assembly and a method for forming the integrated coil assembly in accordance with preferred embodiments of the invention are described. In the following description, numerous details are provided for a more thorough description. It shall be apparent to one skilled in the art, however, that the invention may be practised without such details. In other instances, well-known details have not been described at length so as not to obscure the invention.

The advantages of the preferred embodiments of the invention are manifold. One advantage of the preferred embodiments of the invention is that the integrated coil assembly has coil loops for conducting current at different electrical phases interweaved for better heat dissipation. Thus, when a coil loop of an electrical phase requires more current than other coil loops at different electrical phases, heat is more easily transferred to such other coil loops compared with existing coil assemblies having individual coil loops placed in overlapping positions.

Another advantage of the preferred embodiments of the invention is that the integrated coil assembly has heat-dissipating elements that are formed with a mold compound for molding the coil loops of the integrated coil assembly. Thus, heat generated by the coil loops is better transferred to the surroundings with such integrally formed heat-dissipating elements.

Yet another advantage of the preferred embodiments of the invention is that multi-phase coils of the integrated coil assembly are more accurately placed using the same winding fixture for each of these multi-phase coils. Consequently, the position of each multi-phase coil is more consistently controlled by the winding fixture compared with existing coil assemblies having individual coil loops placed sequentially offset from adjacent phases. Hence, the multi-phase linear motor having the integrated coil assembly provides a more consistent linear force for different electrical phases.

Figure 1:
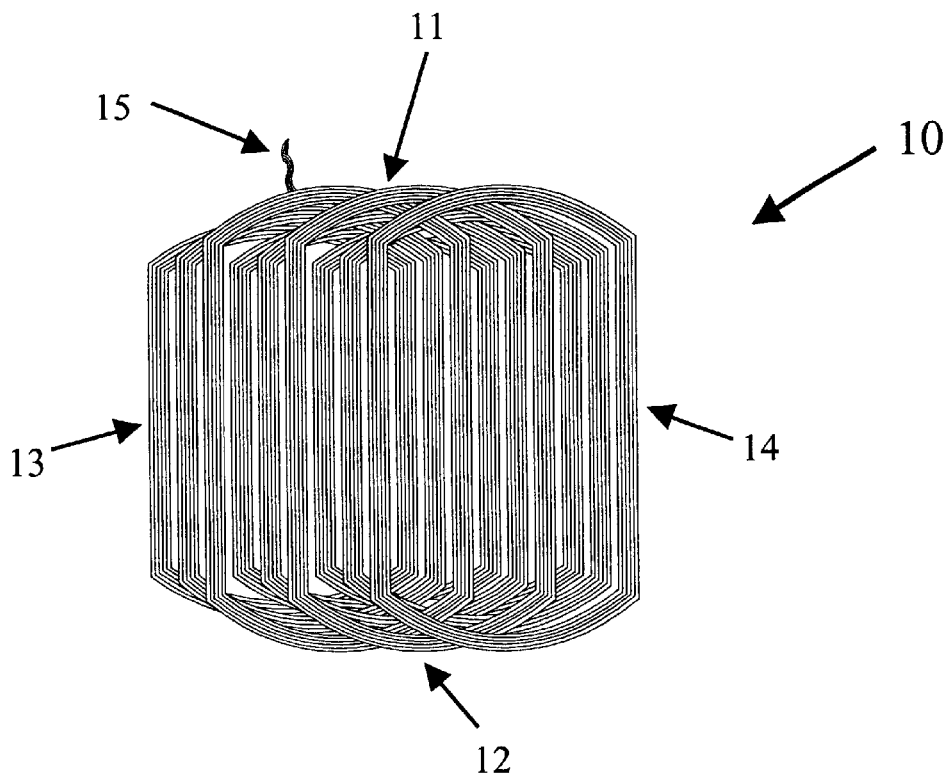
FIG. 1 is a perspective view of an integrated coil assembly in accordance with a preferred embodiment of the invention.

Referring now to FIG. 1, a photocopy of an integrated coil assembly 10 in accordance with a preferred embodiment of the invention. The integrated coil assembly 10 has a plurality of multi-phase coils (not indicated), two opposing portions 11,12 and two other opposing portions 13,14. Each multi-phase coil has a plurality of coil loops. The number of coil loops is equivalent to the number of electrical phases at which electrical current is provided to the integrated coil assembly 10.

Figure 2:
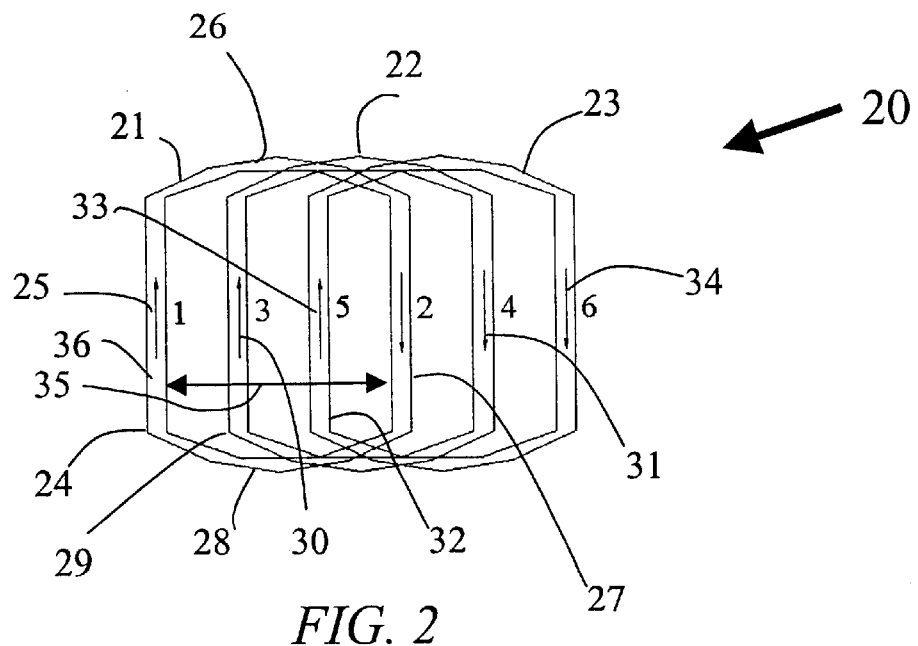
FIG. 2 illustrates a winding sequence for coiling three coil loops of a multi-phase coil of the integrated coil assembly of FIG. 1.

To better describe a multi-phase coil of the integrated coil assembly 10, reference is made to FIG. 2 in which a winding sequence for coiling coil loops of a multi-phase coil 20 is illustrated. Assuming that the integrated coil assembly 10 is for a three-phase electrical current, then the multi-phase coil 20 has three coil loops 21,22,23. Each coil loop 21,22,23 is associated with one of the three electrical phases of the three-phrase electrical current and has at least one coil winding.

The winding sequence for the multi-phase coil 20 begins when a first wire dispenser (not shown in FIG. 2) is positioned, for example, at position 24 to wind a first winding for the coil loop 21 in a clock-wise direction along the direction indicated by arrow 25 and then along portion 26 before returning to the position 24 via portion 27 and portion 28 of the coil loop 21. The first wire dispenser then continues in the same clock-wise direction until completion of a predetermined number of windings for coil loop 21.

Upon completing the predetermined number of windings for the coil loop 21, a second wire dispenser (not shown in FIG. 2) positioned at, for example, position 29 then starts winding another predetermined number of windings for the coil loop 22. The windings for the coil loop 22 are in the same clock-wise direction generally indicated by arrows 30,31. It is to be noted that the position 29 is offset from the position 24 so that the coil loop 22 is offset relative to position of the coil loop 21.

When winding of both the coil loops 21,22 is completed, the coil loop 23 is then wound by a third wire dispenser (not shown in FIG. 2) starting, for example, at position 32 and in the same clock-wise direction generally indicated by arrows 33,34.

It is to be noted that the winding of the coil loops 21,22,23 is supported by a winding fixture (not shown in FIG. 2) associated with the three wire dispensers. Consequently, each coil loop has a coil loop width based upon dimensions of the winding fixture. A coil loop width 35 between the portion 27 and another portion 36 of the coil loop 21 is indicated in FIG. 2.

Upon winding the three coil loops 21,22,23, the first dispenser is then activated to wind another coil loop for another multi-phase coil. Sequential diagrams illustrating a winding sequence for coiling three coil loops of a subsequent multi-phase coil over a preceding multi-phase coil 20 of the integrated coil assembly 10 are shown in FIGS. 3A to 3D. It is to be noted that coil loops of the preceding multi-phase coil 20 in FIGS. 3A to 3D are illustratively cascaded to show relative position of each of the coil loops. However, these coil loops are aligned as shown in FIG. 2 when forming the preceding multi-phase coil 20.

Figure 3A:
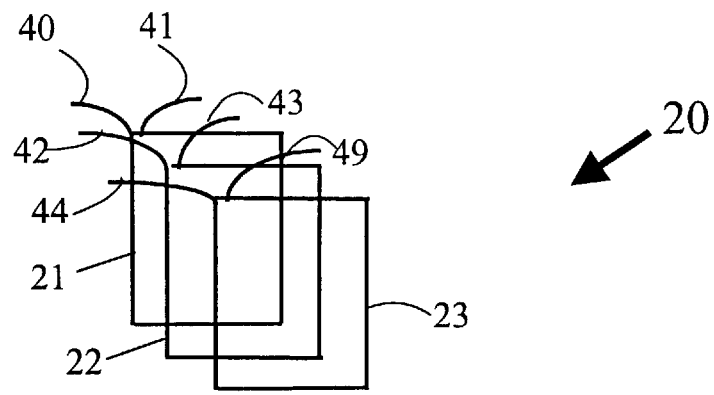
FIGS. 3A to 3D are sequential diagrams illustrating a winding sequence for coiling three coil loops of a subsequent multi-phase coil over a preceding multi-phase coil of the integrated coil assembly of FIG. 1.
Figure 3B:
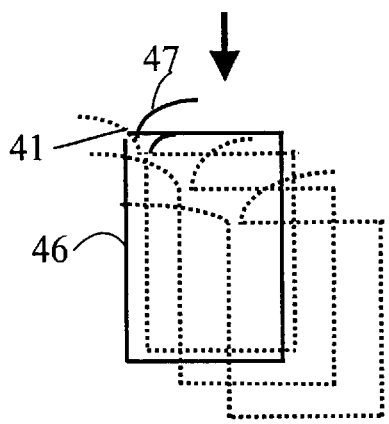
Figure 3C:
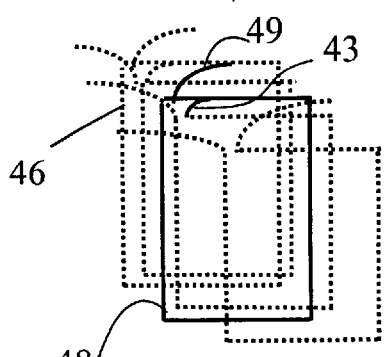

Referring now to FIG. 3A, the preceding multi-phase coil 20 is shown. Each of the coil loops 21,22,23 has, respectively, two opposite end portions 40,41,42,43,44,45. The winding sequence for coiling the subsequent multi-phase coil begins when the first wire dispenser coils a coil loop 46 of the subsequent multi-phase coil starting from the end portion 41 of the coil loop 21. FIG. 3B illustrates the coil loop 46 and the end portion 41 in bold to distinguish against the coil loops 21,22,23 of the preceding multi-phase coil 20.

Figure 3D:
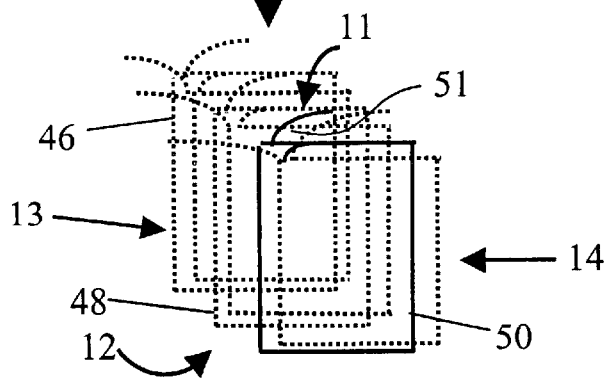

After winding a predetermined number of coil windings, the coil loop 46 now has an end portion 47 where the first wire dispenser ends. Thereafter, the second wire dispenser then begins coiling a coil loop 48, indicated in FIG. 3C, for the subsequent multi-phase coil. The coil loop 48 starts from the end portion 43 and ends at an end portion 49. FIG. 3D shows a coil loop 50 wound by the third wire dispenser with an end portion 51.

As illustrated in FIG. 3D, the coil loops 46,48,50 of the subsequent multi-phase coil and the coil loops 21,22,23 of the preceding multi-phase coil 20 are interweaved at the two opposing portions 11,12. However, all coil loops 21,22,23, 46,48,50 at the two other opposing portions 13,14 are substantially parallel relative to each other.

Figure 4A:
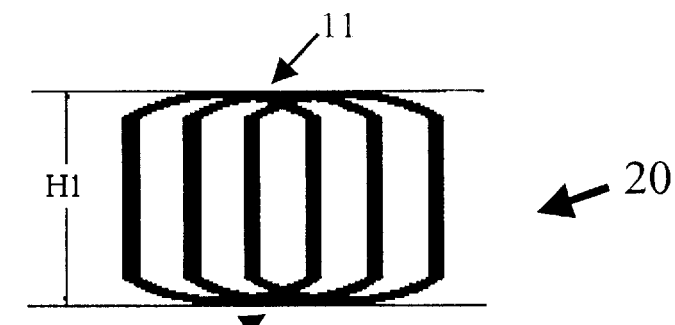
FIGS. 4A to 4C illustrate additional thickness at two opposing portions of each subsequent multi-phase coil relative to a preceding multi-phase coil of the integrated coil assembly of FIG. 1.
Figure 4B:
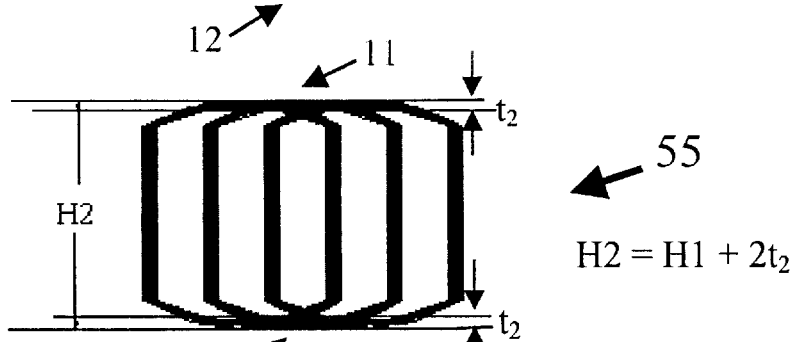
Figure 4C:
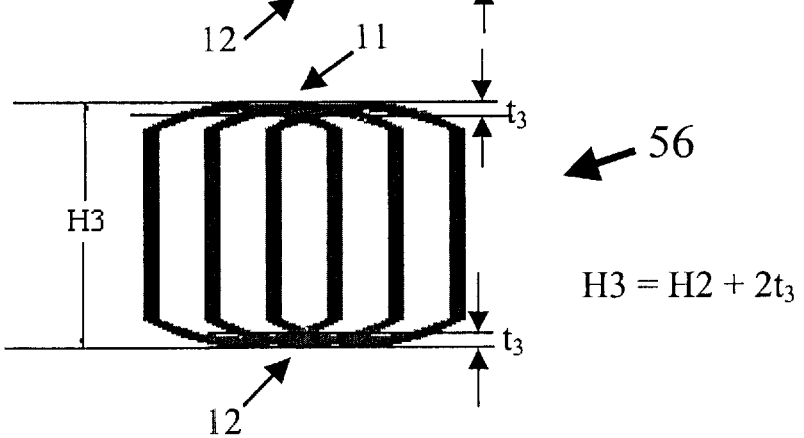

It is to be noted that the coil loop widths of the coil loops 46,48,50 are substantially the same as that of the coil loops 21,22,23. However, the position of the subsequent multi-phase coil is offset relative to the position of the preceding multi-phase coil 20. Also, because of interleaving at the two opposing portions 11,12, the coil loops 46,48,50 is larger than the coil loops 21,22,23 at these two opposing portions 11,12. This larger dimension corresponds to the thickness of the coil loops 46,48,50 as a result of the predetermined number of coil windings for the coil loops 46,48,50. FIG. 4 illustrates the additional thickness of two subsequent multi-phase coils 55,56 at the two opposing portions 11,12 relative to the preceding multi-phase coil 20 and to each other. Specifically, each of the subsequent multi-phase coils 55,56 has a dimension that is larger than the dimension H1 of the multi-phase coil 20, wherein H2=H1+2$t_2$ and H3=H2+2$t_3$.

The number of multi-phase coils required by the integrated coil assembly 10 depends on subsequent application of the integrated coil assembly 10. For example, a multi-phase linear motor may require the integrated coil assembly 10 to have three multi-phase coils.

Upon coiling a required number of multi-phase coils for the integrated coil assembly 10, the multi-phase coils are then molded with an epoxy compound. The molded integrated coil assembly 10 may be formed according to a desired form factor.

Figure 5A:
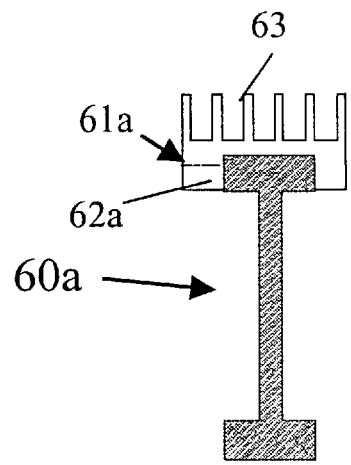
FIGS. 5A to 5C are cross-sectional side views of three molded embodiments of the integrated coil assembly of FIG. 1 when respectively mounted to coil assembly mounts.
Figure 5B:
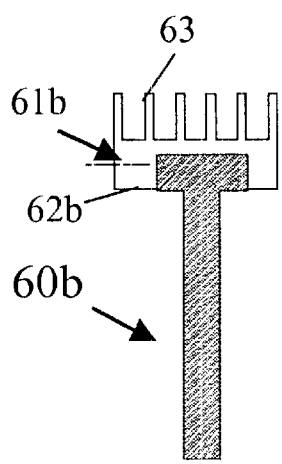
Figure 5C:
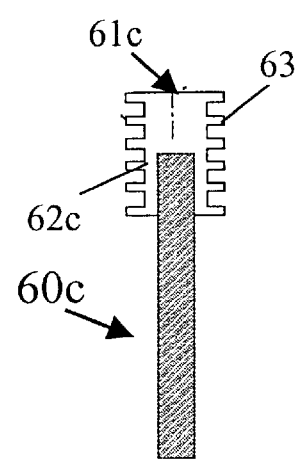

FIGS. 5A to 5C are cross-sectional side views of three molded embodiments 60a,60b,60c of the integrated coil assembly 10 when respectively mounted to three coil assembly mounts 61a,61b,61c. The first molded embodiment 60a is I-shaped and is mounted to a mounting portion 62a of the coil assembly mounts 61a. The second molded embodiment 60b is T-shaped and is mounted to a mounting portion 62b of the coil assembly mount 61b. The third molded embodiment 60c is flat-shaped and is mounted to a mounting portion 62c of the coil assembly mount 61c. The coil assembly mounts 61a,61b,61c are shown with fins 63 as heat-dissipating elements. The coil assembly mounts 61a, 61b,61c are machined from a single piece of metal to form the fins 63 and the mounting portions 62a,62b,62c.

Referring now to FIGS. 6A and 6B, cross-sectional side views of two additional molded embodiments 70a,70b of the integrated coil assembly 10 when respectively mounted to two coil assembly mounts 71a,71b. The molded embodiment 70a comprises fins 72 at an opposite end 73 from a mounting portion 74 of the coil assembly mount 71a. The molded embodiment 70b comprises fins 75 at an opposite end 76 from a mounting portion 77 of the coil assembly mount 71b. The fins 72,75 are formed from the same mold as the molded embodiments 70a,70b.

It is to be noted that the molded embodiment 70b is formed with two sets of multi-phase coils 78,79 molded to provide for at least one groove for flow of air to thereby dissipate heat from the multi-phase coils 78,79. Two grooves 80,81 are indicated for the molded embodiment 70b.

FIGS. 7A and 7B are plan views illustrating air flow 90,91 for heat dissipation for the molded embodiments 70a,70b, respectively. Side edges 92,93 of the molded embodiment 70a are tapered to support the air flow 90. Likewise, side edges 94,95,96,97 of the molded embodiment 70b are tapered to support the air flow 91.

Figure 8:
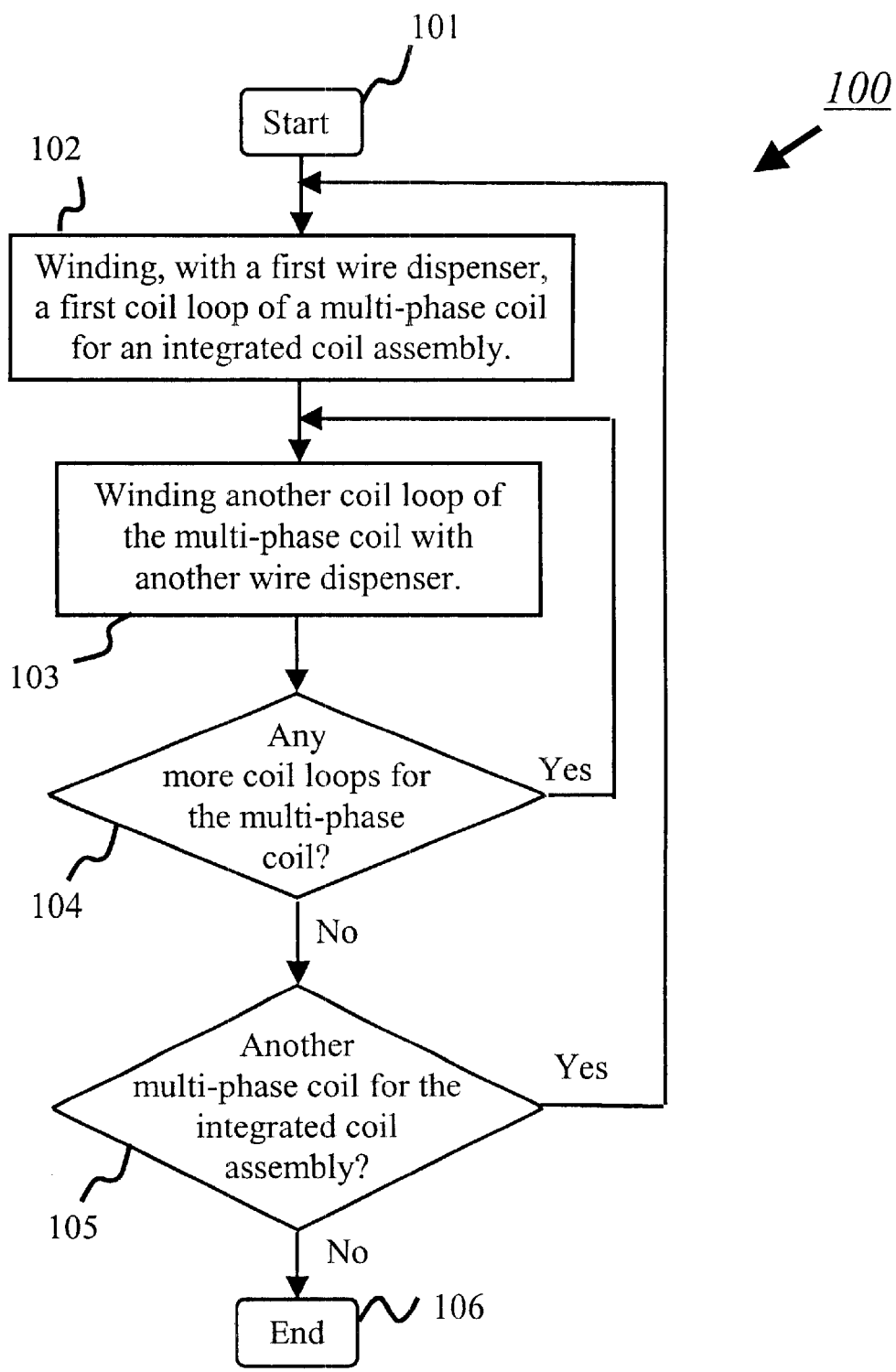
FIG. 8 is a flowchart illustrating a method for forming the integrated coil assembly of FIG. 1.

Referring now to FIG. 8, a flowchart of a method 100 for forming the integrated coil assembly 10 is illustrated. The method 100 starts at step 101 and continues to step 102 at which winding of a first coil loop of a multi-phase coil takes place. A first wire dispenser winds a predetermined number of coil windings for the first coil loop. Upon completion of the first coil loop, another wire dispenser winds another coil loop of the same multi-phase coil at step 103.

The method 100 then determines at decision step 104 whether there are any more coil loops required for the same multi-phase coil. With a 'Yes' following the decision step 104, the method 100 returns to step 103 at which another wire dispenser winds another coil loop of the same multi-phase coil. Accordingly, the number of wire dispensers required for coiling a multi-phase coil depends on the number of different coil loops for the multi-phase coil.

Following a 'No' from the decision step 104, the method 100 proceeds to determine whether another multi-phase coil is required for the integrated coil assembly at decision step 105. With a 'Yes' following the decision step 105, the method returns to step 102 and the winding of another multi-phase coil begins with the winding of a first coil loop for this multi-phase coil. Otherwise, with a 'No' following the decision step 105, the method ends at step 106.

An integrated coil assembly 10, a multi-phase linear motor having the integrated coil assembly 10 and a method 100 for forming the integrated coil assembly in accordance with preferred embodiments of the invention are described. Although several molded embodiments of the integrated coil assembly 10 are described or illustrated, it shall be apparent to persons skilled in the art in view of the preferred embodiments that numerous changes and/or modifications can be made to such preferred embodiments without departing from the scope and spirit of the invention.

What is claimed is:

1. An integrated coil assembly comprising:
   a plurality of multi-phase coils, each multi-phase coil having a plurality of coil loops, each coil loop having at least one coil winding and associated with a respective electrical phase;
   wherein said plurality of coil loops for different multi-phase coils are interweaved at two opposing portions of said plurality of multi-phase coils to form said integrated coil assembly; and
   wherein, at each of said two opposing portions, coil loops of a subsequence multi-phase coil are larger than coil loops of a preceding multi-phase coil.

2. An integrated coil assembly comprising:
   a plurality of multi-phase coils, each multi-phase coil having a plurality of coil loops, each coil loop having at least one coil winding and associated with a respective electrical phase;
   wherein said plurality of coil loops for different multi-phase coils are interweaved at two opposing portions of said plurality of multi-phase coils to form said integrated coil assembly; and
   wherein, at each of said two opposing portions, coil loops of a subsequent multi-phase coil are larger than coil loops of a preceding multi-phase coil by the thickness of coil windings of said preceding subsequent multi-phase coil.

3. A multi-phase linear motor for producing a linear force, said multi-phase linear motor comprising:
   a coil assembly mount having a mounting portion and at least one fin disposed thereon for dissipating heat; and
   an integrated coil assembly, mountable to said mounting portion, having:
      a plurality of multi-phase coils, each multi-phase coil having a plurality of coil loops, each coil loop having at least one coil winding and associated with a respective electrical phase,
      wherein said plurality of coil loops for different multi-phase coils are interweaved at two opposing portions of said plurality of multi-phase coils to form said integrated coil assembly;
   wherein, at each of said two opposing portions, coil loops of a subsequent multi-phase coil are larger than coil loops of a preceding multi-phase coil.

4. A multi-phase linear motor for producing a linear force, said multi-phase linear motor comprising:
   a coil assembly mount having a mounting portion and at least one fin disposed thereon for dissipating heat; and
   an integrated coil assembly, mountable to said mounting portion, having:
      a plurality of multi-phase coils, each multi-phase coil having a plurality of coil loops, each coil loop having at least one coil winding and associated with a respective electrical phase,
      wherein said plurality of coil loops for different multi-phase coils are interweaved at two opposing portions of said plurality of multi-phase coils to form said integrated coil assembly;
   wherein, at each of said two opposing portions, coil loops of a subsequent multi-phase coil are larger than coil loops of a preceding multi-phase coil by the thickness of coil windings of said preceding subsequent multi-phase coil.

5. An integrated coil assembly comprising:
   a plurality of multi-phase coils, each multi-phase coil having a plurality of coil loops, each coil loop having at least one coil winding and associated with a respective electrical phase, wherein said plurality of coil loops for different multi-phase coils are interweaved at two opposing portions of said plurality of multi-phase coils to form said integrated coil assembly and at each of said two opposing portions, coil loops of a subsequent multi-phase coil are larger than coil loops of a preceding multi-phase coil, by the thickness of coil winding of said preceding subsequent multi-phase coil.

6. The integrated coil assembly as claimed in claim 5, wherein a coil loop of a subsequent multi-phase coil for conducting current at an electrical phase is formed adjacent to a coil loop of a preceding multi-phase coil for conducting current at said electrical phase.

7. The integrated coil assembly as claimed in claim 5, wherein said plurality of coil loops of said integrated coil assembly have two other opposing portions, said two other opposing portions being substantially parallel to each other.

8. The integrated coil assembly as claimed in claim 5, wherein the coil loops for each multi-phase coil have substantially the same coil width relative to each other.

9. The integrated coil assembly as claimed in claim 5, wherein the coil loops for different multi-phase coils of said integrated coil assembly have substantially the same coil width relative to each other.

10. A multi-phase linear motor for producing a linear force, said multi-phase linear motor comprising:

a coil assembly mount having a mounting portion and at least one fin disposed thereon for dissipating heat; and an integrated coil assembly, mountable to said mounting portion, having a plurality of multi-phase coils, each multi-phase coil having a plurality of coil loops, each coil loop having at least one coil winding and associated with a respective electrical phase, wherein said plurality of coil loops for different multi-phase coils are interweaved at two opposing portions of said plurality of multi-phase coils to form said integrated coil assembly, and each of said two opposing portions, coil loops of a subsequent multi-phase coil are larger than coil loops of a preceding multi-phase coil by the thickness of coil windings of said preceding subsequent multi-phase coil.

11. The multi-phase linear motor of claim 10, wherein a coil loop of a subsequent multi-phase coil for conducting current at an electrical phase is formed adjacent to a coil loop of a preceding multi-phase coil for conducting current at said electrical phase.

12. The multi-phase linear motor of claim 10, wherein said plurality of coil loops of said integrated coil assembly have two other opposing portions, said two other opposing portions being substantially parallel to each other.

13. The multi-phase linear motor of claim 10, wherein the coil loops for each multi-phase coil have substantially the same coil width relative to each other.

14. The multi-phase linear motor of claim 10, wherein the coil loops for different multi-phase coils of said integrated coil assembly have substantially the same coil width relative to each other.

15. The multi-phase linear motor of claim 10, wherein said integrated coil assembly comprises a molding compound to mold said integrated coil assembly for mounting to said mounting portion.

16. The multi-phase linear motor of claim 15, wherein said integrated coil assembly comprises at least one fin molded from said moulding compound.

17. The multi-phase linear motor of claim 15, wherein said integrated coil assembly comprises at least one groove molded from said molding compound.

18. The multi-phase linear motor of claim 15, wherein said integrated coil assembly comprises molded side edges, said molded side edges being tapered to support airflow.

* * * * *